United States Patent [19]

Sheinkop

[11] Patent Number: 4,544,392
[45] Date of Patent: Oct. 1, 1985

[54] APPARATUS FOR THERMALLY CONDITIONING HEAT SOFTENABLE MATERIAL

[75] Inventor: Isac M. Sheinkop, Reynoldsburg, Ohio

[73] Assignee: Owens-Corning Fiberglass Corporation, Toledo, Ohio

[21] Appl. No.: 626,171

[22] Filed: Jun. 29, 1984

[51] Int. Cl.[4] ............................................. C03B 37/09
[52] U.S. Cl. ..................................... 65/1; 65/12; 65/DIG. 4; 65/356
[58] Field of Search .............. 65/1, 2, 12, DIG. 4, 65/356

[56] References Cited

U.S. PATENT DOCUMENTS

| | | | |
|---|---|---|---|
| 2,186,718 | 1/1940 | Ferguson . | |
| 3,912,477 | 10/1975 | Brady et al. | 65/1 |
| 4,161,396 | 7/1979 | Greene et al. | 65/1 |
| 4,270,941 | 6/1981 | Babbitt | 65/1 |
| 4,285,711 | 8/1981 | Willis | 65/1 |
| 4,325,721 | 4/1982 | Jensen | 65/1 |
| 4,402,724 | 9/1983 | Weisenburger et al. | 65/128 |

FOREIGN PATENT DOCUMENTS

| | | | |
|---|---|---|---|
| 635054 | 11/1978 | U.S.S.R. | 65/1 |
| 681005 | 8/1979 | U.S.S.R. | 65/DIG. 4 |
| 897721 | 1/1982 | U.S.S.R. | 65/1 |

*Primary Examiner*—Robert Lindsay
*Attorney, Agent, or Firm*—Ronald C. Hudgens; Patrick P. Pacella; Ronald E. Champion

[57] ABSTRACT

The present invention is an auxiliary heated bushing block for a fiber forming furnace. The bushing block fits below an opening in the bottom of a forehearth of a glass melting furnace. A non-circular opening through the bushing block allows molten material to flow into a fiber forming bushing. Electrical resistance heater elements protrude through the ends of the bushing block into the non-circular opening into contact with the molten material. Each electrical resistance heater element has associated with it a separate adjustable power supply to provide individually variable power to each electrical resistance heater element. By varying the power settings of each power supply, the molten material as it flows through the non-circular opening of the bushing block can be selectively thermally conditioned.

1 Claim, 3 Drawing Figures

APPARATUS FOR THERMALLY CONDITIONING HEAT SOFTENABLE MATERIAL

BACKGROUND OF THE INVENTION

This invention relates to an apparatus for thermally conditioning heat softenable material such as glass, and more specifically, to an auxiliary heated bushing block for feeding heat softenable glass to a stream feeder or bushing in a manner that thermally conditions the glass.

In a typical direct melt operation, glass batch is reduced to a molten state and refined in a furnace. The refined glass is flowed through a forehearth channel to openings in the bottom of the channel. The glass flows downwardly through the openings to electrically heated stream feeders or bushings disposed in spaced relation along the forehearth. Streams of glass flow through orifices in the bushings, and the streams are attenuated to filaments or fibers by well known methods.

A temperature gradient is produced in the molten glass as it flows through the opening in the forehearth downward into the bushing. The bushing, being generally rectangular in shape, tends to radiate heat from the ends more rapidly than at the center. The difference in temperature of the glass at the bushing block and the glass at the center of the passage in the bushing block can be 100° F. or more. Such glass, having a large temperature gradient, entering a bushing during the operation of the fiber forming process, can cause a non-uniform heat pattern across the bottom plate of the bushing and an inefficient fiber forming operation. Such glass entering a fiber forming bushing can result in the production of fibers which do not meet process specifications and can result in process interruptions.

Various schemes have been devised to attempt to ensure that the glass being fed to a fiber forming bushing has a uniform temperature distribution. Greene et al, U.S. Pat. No. 4,161,396, teaches various geometrical configuration for flow blocks to minimize the heat losses due to these flow blocks. Babbitt, U.S. Pat. No. 4,270,941, teaches the use of heat pipes located in the opening of a flow block to attempt to make the temperature of the molten material uniform across the opening. Further investigation has shown, however, that by selectively applying heat to the molten material as it flows through a bushing block, especially at the ends, a more efficient method of ensuring that the molten material, as it exits a bushing, will produce uniform fiber diameters across the width of the bushing.

SUMMARY

The present invention is an apparatus for thermally conditioning heat softenable material such as glass. The apparatus comprises a refractory bushing block having a non-circular opening to transmit the heat softenable material from the opening in the bottom of a forehearth to a fiber forming bushing and individually controlled electric reistance heater elements protruding through the ends of the refractory bushing block into the non-circular opening in direct contact with the heat softenable material. The electric resistance heater elements receive their power from individual power supplies which can be adjusted to control the amount of power to each heater element and, hence, the amount of auxiliary heat produced by these elements.

It is, therefore, an object of this invention to provide a bushing block having auxiliary heater devices in the ends thereof to introduce additional heat to the molten material flowing into a fiber forming bushing. It is a further object of this invention to make the quantity of heat adjustable.

Other objects of the invention will become apparent as the invention is described more clearly hereafter in detail with reference being made to accompanying drawings.

DETAILED DESCRIPTION OF THE INVENTION

Figure 1:
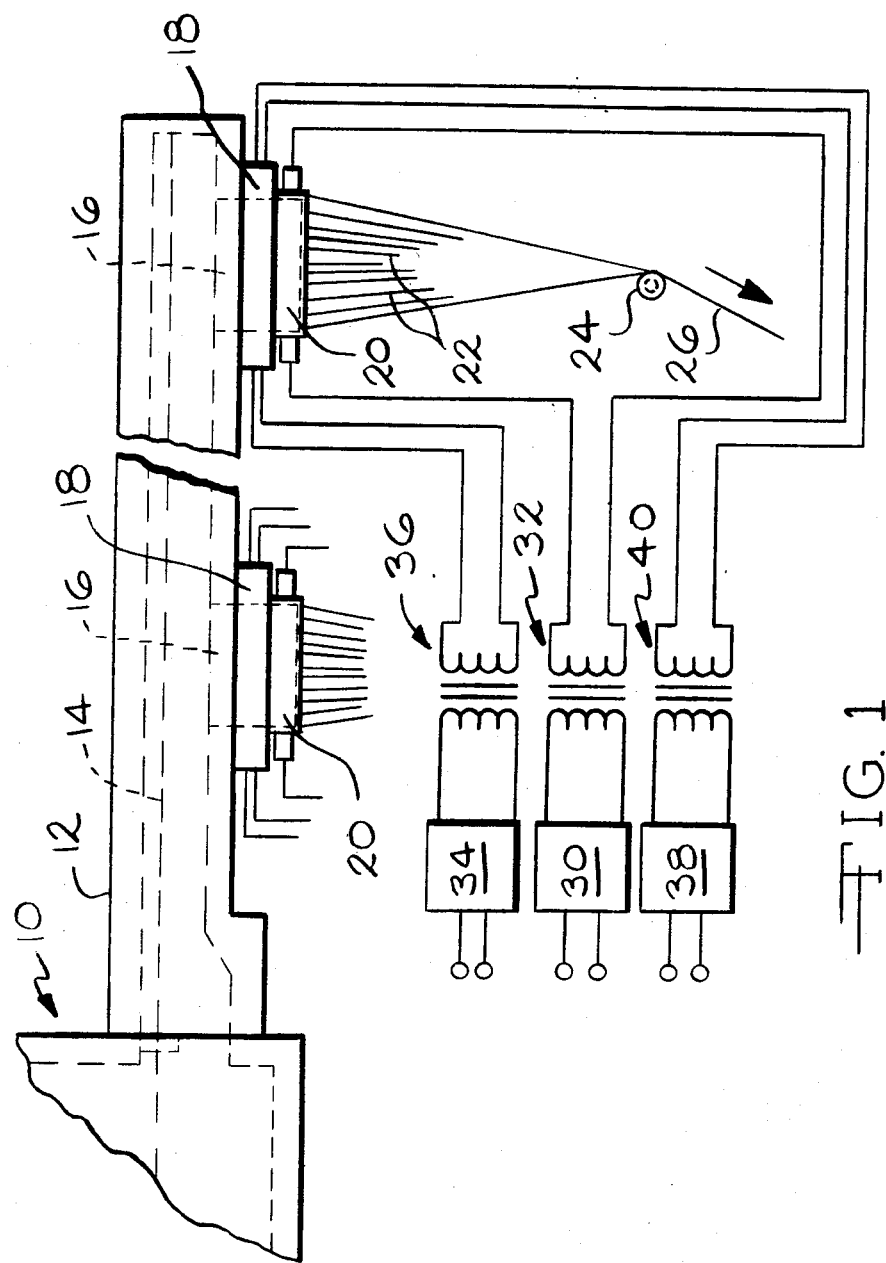
FIG. 1 is a side view of the forehearth and a bushing arrangement of a fiber forming furnace showing the electrical connections according to the principles of the present invention.

Referring to FIG. 1, a portion of the melting section 10 of a direct melt glass furnace is shown. The molten glass flows into a forehearth 12 and floods the forehearth up to a level 14. The molten heat softenable material, such as glass, flows along the forehearth to a multitude of fiber forming positions. In a typical position, the molten glass flows through an opening 16 in the floor or bottom of the forehearth. The glass then flows through an auxiliary heated bushing block 18 for thermally conditioning the heat softenable material and into a fiber forming bushing 20 where the molten material is attenuated into fibers 22 as known in the glass fiber forming arts. The fibers are then gathered by a gathering wheel 24 which may also apply fluid to the fibers and led as a bundle 26 to other forming opertions (not shown). The fiber forming bushing 20 is an electrical resistance heated device which receives its power from a transformer 32. Transformer 32 receives its power from a silicon controlled rectifier 30 which is fed by commercial electrical source.

Figure 2:
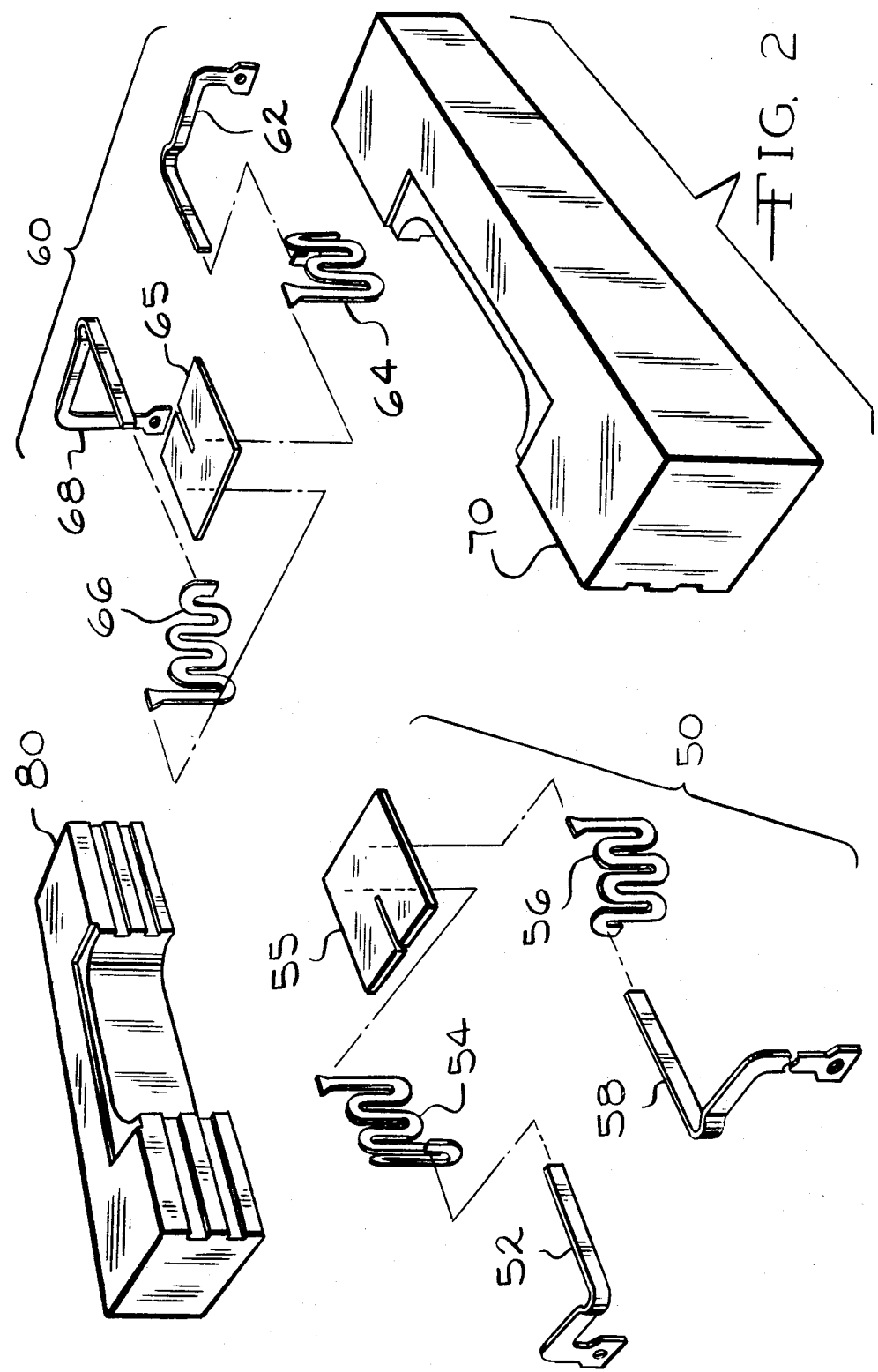
FIG. 2 is an exploded view of the auxiliary heated bushing block and heater elements.

The auxiliary heated bushing block 18 is shown in greater detail in FIG. 2. Two heater assemblies 50 and 60, which are identical, are held between two refractory blocks 70 and 80 which preferably are identical. The heater assemblies are resistance heater elements comprised of a bus bar 58 which is identical to bus bar 68, joined to a first serpentine heater element 56, identical to heater element 66, which is curved in a semi-circle. The serpentine heater element is joined to a flow plate 55, identical to flow plate 65. A second bus bar 52, identical to bus bar 62, is joined to a second serpentine heater element 54, identical to heater element 64. The second heater element is joined to the flow plate 55 while the second serpentine heater element 64 is joined to flow plate 65. In practice, when an electrical current is impressed on bus bar 58, the current flows through the bus bar, through the first serpentine heater element 56, through flow plate 55, through the second serpentine heater element 54 to bus bar 52. In this manner, the glass flowing past the ends of the non-circular opening formed by refractory blocks 70 and 80 being placed in a face to face relationship may be independently heated. Refractory blocks 70 and 80 are identical and are formed with a hollowed out area 81 in their faces 82 to form a non-circular opening when placed in a face to face relationship. Recesses 83, 84, 85 and 86 are also cut in their faces to accept the bus bars 52, 58 and 62, 68 to allow the bus bars to protrude from outside into the inside of the non-circular opening. The recesses are cut to a depth of approximately one-half the thickness of the bus bars. An indentation 87 is also provided in the top of the refractory blocks to hold the flow plates 55 and 65 to correctly position the heater elements 54, 56 and 64, 66. Indentation 87 is equal to the thickness of the flow plates.

Referring back to FIG. 1, it can be seen that a separate power source is provided for each heater element. A silicon controlled rectifier 34 and a transformer 36 is provided for one heater element, such as 50, of FIG. 2 and a second silicon controlled rectifier 38 and transformer 40 is provided for the other heater assembly, such as 60 of FIG. 2.

Figure 3:
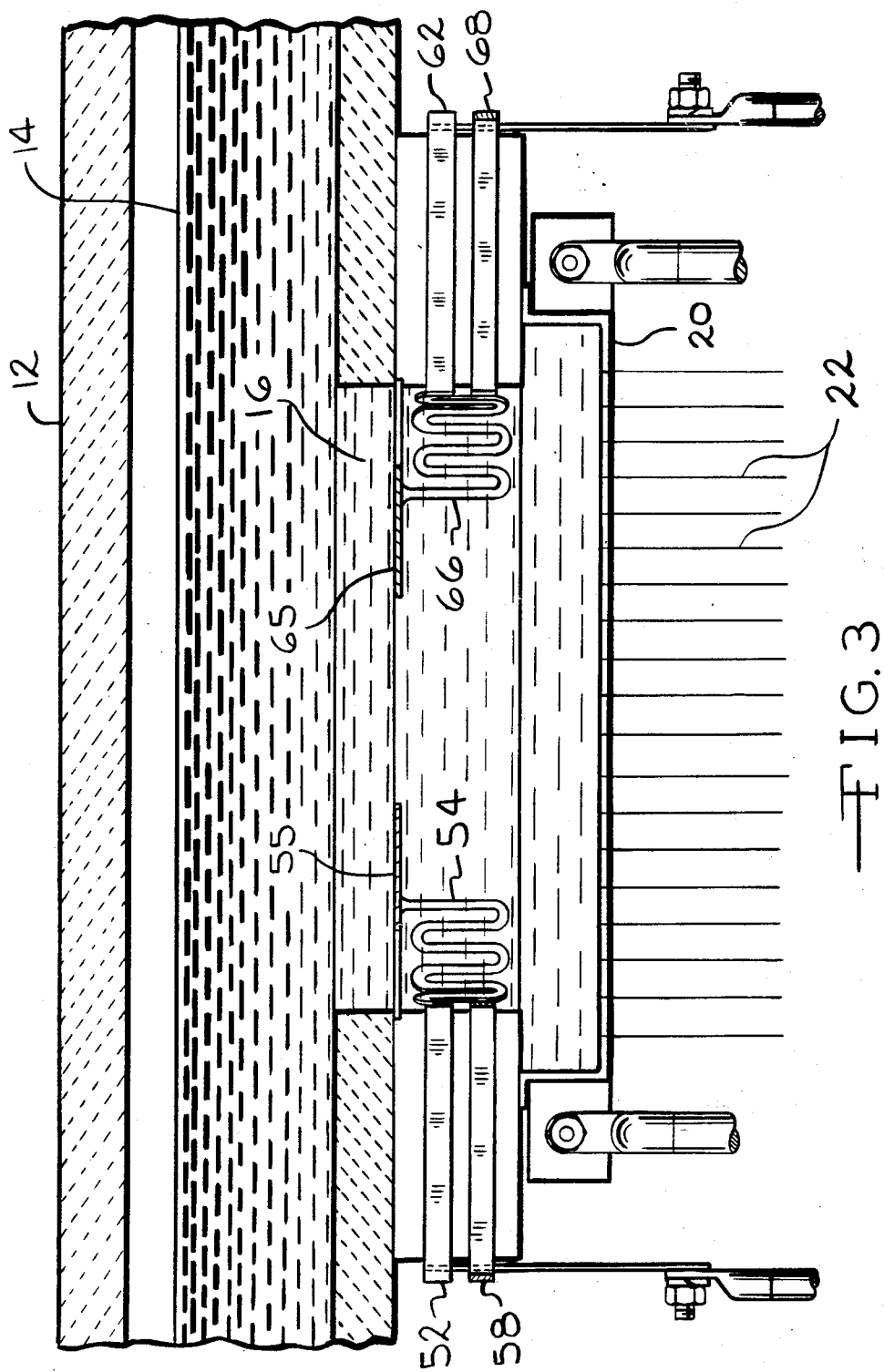
FIG. 3 is a sectional side view of the forehearth, the auxiliary heated bushing block and the bushing of the present invention, along the centerline of the forehearth.

FIG. 3 shows a cross section of a portion of the forehearth at a fiber forming position. Without the auxiliary heated bushing block, the molten glass would flow down forehearth 12 through the opening in the bottom of the forehearth 16 directly into the fiber forming bushing 20. Because the fiber forming bushing is generally rectangular in shape, the ends of the bushing tend to radiate heat from the molten glass more rapidly than from the center of the bushing. The fibers 22 produced in the end regions have a different diameter than the fiber produced centrally of the bushing. With the auxiliary heated bushing block, heat may be added selectively to the ends of the non-circular opening to compensate for the heat loss at the ends of the bushings. The amount of heat added is adjusted until all fiber diameters produced by the bushing are the same across the face of the bushing.

It will be evident from the foregoing that various modifications can be made to this invention. Such, however, are considered to be within the scope of the invention as described in the following claims.

I claim:

1. A bushing block with auxiliary heaters for the outlet of a glass melting furnace comprising:
    (a) a first heater having a first formed bus bar connected to a first serpentine resistance heating element, said first serpentine resistance heating element being connected to a flow path, said flow plate being connected to a second serpentine resistance heating element, said second serpentine resistance heating element connected to a second formed bus bar;
    (b) a first refractory support being generally rectangular in shape having a first recess of a depth not less than one half the thickness of the first formed bus bar said first recess running laterally across the face of said refractory support to position said first formed bus bar, a second recess having a depth of at least one half the thickness of the second formed bus bar said second recess running laterally across the face of said refractory support below said first recess to position said second formal bus bar, a centrally located cavity in said first refractory support opening toward the face thereof with arcuately formed ends to accept the serpentine resistance heating elements, a recess in the top of said first refractory support said top recess having a depth of at least the thickness of said flow plate to position and restrain said flow plate;
    (c) a second heater identical to said first heater;
    (d) a second refractory support identical to said first refractory support;
    (e) said first heater and said second heater positioned on said first refractory block wherein said first formed bus bar of said first heater engages said first recess in the face of said first refractory support, said first formed bus bar of said second heater engages said first recess of said first refractory support on the opposite side thereof, said second formed bus bar of said first heater engages said second recess in the face of the first refractory support, said second formed bus bar of said second heater engages said second recess in the opposite side of said first refractory support, said flow plate of said first heater engages the recess in the top of said first refractory support, said flow plate of said second heater engaging the recess in the top of said first refractory support;
    (f) said second refractory support positioned face to face coextensive with said first refractory support positioning said first heater and said second heater between said first refractory support and said second refractory support forming a non-circular opening in the center thereof to encircle the serpentine heater elements;
    (g) a first adjustable electrical power supply connected to said first formed bus bar and said second formed bus bar of said first heater; and
    (h) a second adjustable electrical power supply connected to said first formed bus bar and said second formed bus bar of said second heater.

* * * * *